Jan. 20, 1959     K. FEDERN     2,869,936
SUBSTANTIALLY RIGID JOURNALLING DEVICE FOR ROTORS
Filed Nov. 18, 1957     3 Sheets-Sheet 1

Jan. 20, 1959  K. FEDERN  2,869,936
SUBSTANTIALLY RIGID JOURNALLING DEVICE FOR ROTORS
Filed Nov. 18, 1957  3 Sheets-Sheet 2
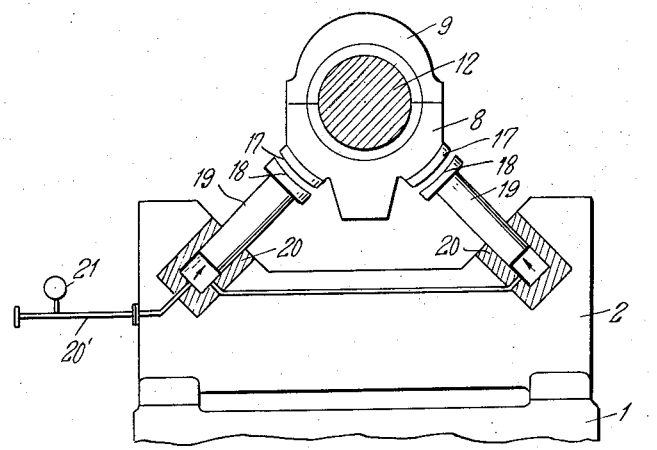
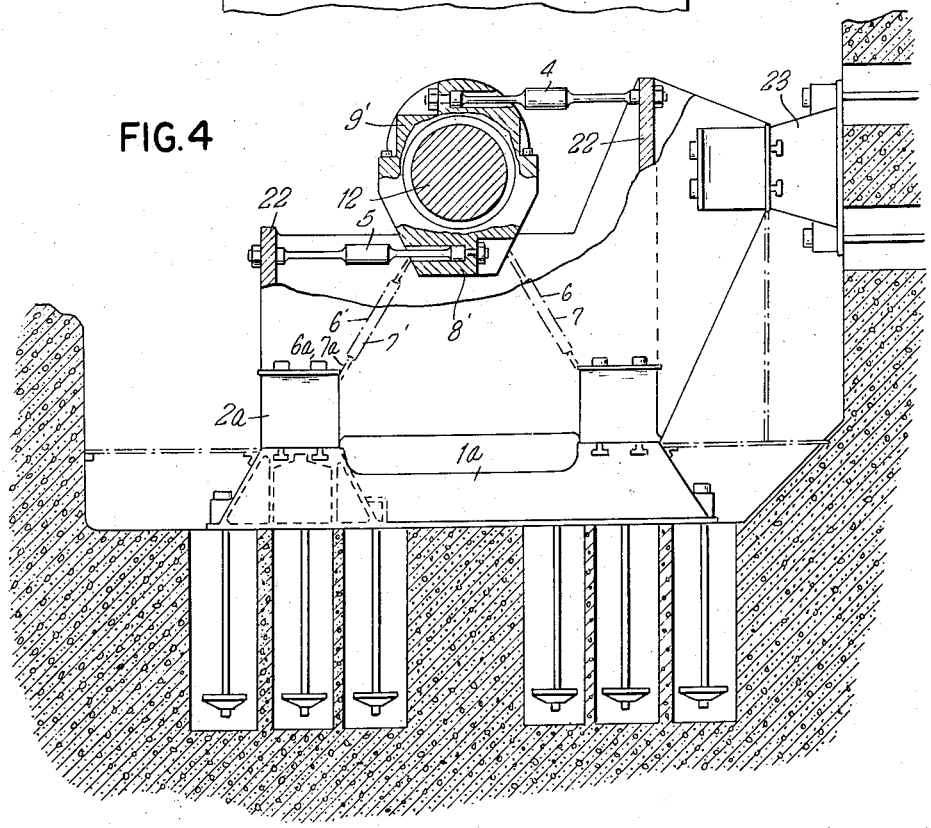

United States Patent Office 2,869,936
Patented Jan. 20, 1959

2,869,936

SUBSTANTIALLY RIGID JOURNALLING DEVICE FOR ROTORS

Klaus Federn, Darmstadt, Germany, assignor to Carl Schenck Maschinenfabrik, G. m. b. H., Darmstadt, Germany, a corporation of Germany Application November 18, 1957, Serial No. 697,065

Claims priority, application Germany November 21, 1956

10 Claims. (Cl. 308—15)

My invention relates to a journalling device for rotors and is preferably though not exclusively intended for use in dynamic balancing machines for the processing of rotor work-pieces running at higher speeds, especially near critical speed or at super-critical speeds, where the rotor can no longer be considered a rigid body but is subjected to bending deformation during rotation.

Generally, in machines where a rotor, running near critical or at super-critical speed, may become elastically deformed, the journalling structure for the rotor should be such as to prevent such deformation from imposing detrimental constraining forces upon the bearing and the rotor shaft. This applies particularly to dynamic balancing machines for analyzing the unbalance of elongated shaft-elastic bodies at super-critical speeds.

Rotor journalling devices previously proposed for satisfying the just-mentioned requirement are provided with spherically movable bearings. One of these proposals, made with reference to balancing machines but not yet within public knowledge, provides each individual bearing of the journalling device with several supporting struts or rods. At each individual bearing, the supporting rods are so arranged as to permit the required mobility of the bearing in the direction of two mutually perpendicular axes extending transverse to the journal axis of the bearing and through the center point of the bearing, while additionally permitting a translatory motion of the bearing in the direction of one axis transverse to the journal axis. This prior proposal, although affording a desirable improvement, leaves much to be desired because the translatory mobility of the individual bearings in the direction of a transverse axis may detrimentally affect the oscillatory behaviour of the rotor. Such motions may result in sub-harmonic precession and nutation motions of the rotor axis and hence may falsify the measuring results; and such translatory mobility also shifts the natural critical frequencies of the rotor toward higher speeds of rotation, which is often undesirable.

There have also been proposals according to which the individual bearing permits the rotor axis a rotational movement about two mutually perpendicular axes transverse to the axis of rotation, and in which the bearing is not capable of translatory motion in the direction of the transverse axes. Such bearings are mounted in substantially rigid relation to the machine bed structure but permit tumbling movement of the rotational axis of the rotor. These journal structures are provided with spherical members mounted between the machine bed and the bearings proper which, by means of a sliding or rolling motion on a spherical surface, permit the bearing to angularly deflect in the event of bending deformation of the rotor. Such journalling structures are unsatisfactory for many applications, particularly in high-speed balancing machines, due to the inevitable clearance and friction occurring between the spherically displaceable members and resulting in measuring errors.

It is an object of my invention to eliminate the above-mentioned shortcomings and to provide a journalling device, preferably for use in dynamic balancing machines, that secures a satisfactory journalling or accurate measuring under all operating conditions by being rigid and without clearance in all radial directions, but being spherically yielding elastically so as to permit bending deflections of the rotor axis without impeding frictional forces.

Another, more specific object of my invention is to devise a journalling device that is substantially rigid normally but also satisfies the combination of the following two requirements. On the one hand, the journal device is to allow tumbling motions of the rotor axis, as may be due to bending deformation, to occur in two given degrees of freedom and without constraining friction while exerting upon the rotor only an elastic return moment of approximately linear characteristic, these two degrees of freedom being defined by two mutually perpendicular axes of permissible motion extending transverse to the axis of rotation and through the center point of the individual journal bearing. On the other hand, the same journal device is to rigidly resist any motion of the journal bearing rotor in the direction of the axis of the rotor rotation, any translatory motion in all radial directions through the center point of the individual bearing, and any rotation of the bearing proper about the axis of rotation. Due to the unavoidable elasticity of the rod material, this can naturally be only achieved to some degree of perfection. But the degree of rigidity in all radial directions should preferably be equal.

To achieve these objects, and in accordance with a feature of my invention, I provide the journalling device at each individual bearing location with a plurality, preferably an even number, of at least four spring rods of elongated shape which are rigid to pull and compression and, over most of their length, to bending but have each at least one bendingly elastic portion, and which brace the bearing against the machine bed to prevent rotary motion of the bearing about the journalling axis, the totality of these rods being uniformly hard and unyielding in all directions so as to maintain the center point of the individual bearing rigidly fixed relatively to the machine bed structure with the desired accuracy, regardless of any oscillatory motion of the rotor shaft journalled in the bearing; and I further mount the spring rods, preferably in pairs, in respective geometric planes extending through the journalling axis of the bearing or perpendicular to it, two of the rods occupying a first one of these planes and being inclined relative to each other from the machine bed toward the bearing so as to have their respective longitudinal axes intersect the journalling axis at the same point, preferably on the center point of the bearing, whereas two other rods extend in another plane perpendicular to the rotor axis and are preferably arranged in parallel relation to each other and equally spaced from the center point of the bearing, and preferably perpendicular to the first plane. But the degree of rigidity in all radial directions should be preferably equal.

According to another feature of my invention, relating particularly to the use of the journalling device in dynamic balancing machines, the device is provided with measuring gage means for accurate response to dynamic force or motion. The particular types of these measuring means are not essential. They may consist, for instance, of electric variable-resistance devices, electric charge-generating devices, inductive, capacitive, optically-electrical or thermo-electrical devices. Preferably, however, the measuring devices comprise wire strain-gage elements which are connected with the above-mentioned spring rods, or mounted on these rods, particularly on the bendingly elastic portions thereof. In the latter case, the strain gages are preferably mounted at those locations where the amount of bending is a minimum, and are preferably symmetrically distributed over such locations.

According to still another feature of the invention, the rotor journalling device is equipped, if desired, with adjustable damping members. These members may be provided with friction surfaces and are mounted between the housing of the bearing and the machine bed so that any occurring bearing oscillations in the available two degrees of freedom are damped by friction.

According to another feature of my invention, applicable to a journalling device with more than four spring rods at each individual bearing, those spring rods that prevent rotary motion of the bearing about the journalling axis extend from the bearing in opposite directions respectively to the bed structure to which these rods are secured; and in this particular case it is also within the scope of the invention to use only a single rod at each individual bearing for preventing the just-mentioned rotary movement.

The foregoing and other objects and features of my invention will be apparent from the embodiments illustrated by way of example on the drawings, in which:

Fig. 3 shows an axial view, partly in secton, of the journalling structure illustrated in Fig. 1, but provided with damping devices, the bracing rods being omitted in Fig. 3.

Fig. 4 shows an axial and partly sectional view of another journalling structure provided with six bracing rods at each individual bearing.

Figure 1:
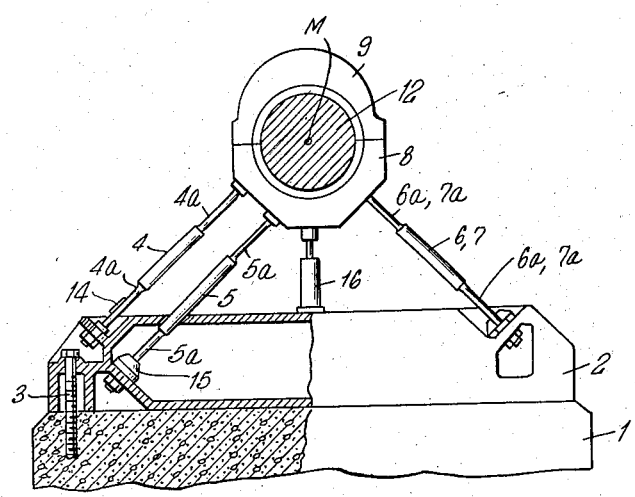
Fig. 1 shows an axial view, partial in section, of an individual bearing of the journalling device.
Figure 2:
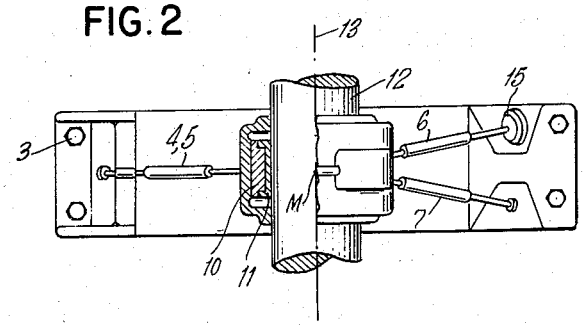
Fig. 2 is a top view of the same device.

According to Figs. 1 and 2, each individual bearing of the journalling structure comprises a support 2 firmly mounted on the machine bed structure 1 by means of through bolts 3. Firmly connected to the support 2 are four struts 4, 5, 6, 7, each consisting of an elongated steel rod rigid with respect to all occurring pulling, and compressing forces. Each rod is generally rigid also with respect to bending deformation but is provided with portions 4a, 5a, 6a or 7a of reduced cross section so as to be bendingly elastic in that portion. The rods are shown to have circular cross section although rods of rectangular or other cross section are also applicable, provided the constricted portions 4a to 7a are such as to permit elastic bending of each rod in the proper direction according to the following explanation. The respective upper ends of the four rods are firmly connected with the lower housing portion 8 of the bearing. Mounted between the lower portion 8 and the cover portion 9 of the bearing is the bearing insert 10 proper which is provided with two half shells of 11 forming the lining of the bearing. The shaft 12 of the rotor is journalled in the bearing shells 11.

The spring rods 4 and 5 are located in a geometric plane which extends perpendicular to the journalling or main axis of the bearing denoted in Fig. 2 by a dot-and-dash line 13. This plane extends through the center point M of the bearing. The two spring rods 4 and 5 are parallel to each other and are each inclined 45° toward the horizontal. They are equally spaced from the main axis. That is, the respective longitudinal axes of the two rods 4 and 5 are spaced from the center point M the same radial distance on opposite sides respectively of the center point. This particular arrangement of spring rods 4 and 5 has the effect of rigidly transmitting to the machine bed structure any forces acting in the axial directions of rods 4, 5 as well as any forces that may result from friction between the rotor shaft 12 and the bearing shells and that have the tendency to turn the housing of the bearing about the main axis 13. Consequently, the spring rods 4 and 5 deprive the journalling structure of the freedom of motion in a direction inclined 45° toward the vertical, and also of the freedom of motion about the main journalling axis of the bearing.

The spring rods 6 and 7 are located in a geometric plane which is inclined 45° toward the horizontal and passes through the main axis 13. The rods 6 and 7 are symmetrically inclined toward each other, for instance at an angle of 22°, so that their respective longitudinal axes intersect each other as well as the main axis 13 on the center point M of the bearing. It will be noted that the plane defined by rods 6 and 7 is perpendicular to the plane defined by rods 4 and 5. By virtue of this arrangement, the spring rods 6 and 7 deprive the journalling structure of the freedom to move in the direction of the main axis 13 as well as of the freedom of motion in the direction of common symmetry axis of rods 6 and 7.

The supporting structure formed by the totality of spring rods is only slightly stressed by static and dynamic rotor forces because the forces introduced into the rods at the points of junction with bearing are transmitted over an only short length of rod structure to the rigid machine bed.

For measuring oscillatory forces in the spring rods, suitable gages may be mounted on these rods or on some of them. Such gages are preferably mounted on the bendingly elastic portions 4a, 5a, 6a and 7a of the rods, as is shown for example for rod 14 which has its lower portion 4a provided with a strain-wire gage. Instead, a measuring gage may also be provided at the foot end of the rods, as is shown for rods 5 and 6, whose foot ends acts upon respective pressure-measuring capsules 15. The rotor-journalling structure may also be provided with a measuring gage 16 located between the lower housing portion 8 of the bearing and the support 2, as is shown in Fig. 1. The gage 16 responds to relative motion between parts 8 and 2. Mounting a measuring device 16 at the illustrated location affords an accurate measuring of the oscillatory forces occurring at the bearing location, because, by virtue of the spring-rod assembly, the occurrence of stresses tending to deform the supporting structure, are avoided.

As explained above, the only possibility of elastic motion available to the individual bearing, is a tumbling motion about the center point M along two mutually perpendicular directions that extend transverse to the main axis 13 and through the center point M. In order to permit damping any oscillatory movement in these two remaining degrees of freedom, the lower portion 8 of the bearing, as shown in Fig. 3, is provided with spherically convex friction surfaces 17 which cooperate with stationary friction faces 18 likewise of spherical shape. The two spherical surfaces 17 have a common center point coincident with the center point M of the bearing. The friction faces 18 form part of respective piston structures 19 which are displaceable in respective cylinders 20 mounted on the support structure 2. The two cylinders are hydraulically connected with a pressure supply line 20' which permits moving the piston structures into engagement with the spherical surfaces 17 of the bearing when desired. The amount of frictional damping thus obtainable depends upon the hydraulic pressure in line 20' which can be adjusted with the aid of a manometer 21. The device is preferably provided with return springs (not shown) which disengage the friction members when the pressure in line 20' is relieved.

According to the embodiment shown in Fig. 4, each individual bearing of the journalling device is provided with six spring rods denoted by 4, 5, 6, 7, 6' and 7'. The spring rods 4 and 5 correspond, as to function, to the spring rods 4 and 5 in Fig. 1. The spring rods 6 and 7, of which only one is visible, are mounted in the same manner and have the same function as the spring rods denoted by 6 and 7 in Fig. 2. The spring rods denoted by 6' and 7' in Fig. 4 likewise have the same angular arrangement as shown for rods 6 and 7 in Fig. 2, except that they are located on the other side of the bearing structure in symmetrical relation to spring rods 6 and 7. With such an arrangement, the spring rods 4 and 5 can be located, as shown, on opposite sides, so as to act in mutually opposed directions in the manner of a lemniscate-type linkage. Rod 4 acts upon the upper housing portion 9' and rod 5 upon the lower housing portion 8' of the bearing. The respective foot ends of rods 4 and 5 are secured to upwardly extending portions 22 of the bearing support 2a which is firmly mounted on the machine bed structure 1a. If the machine bed structure is located in a pit, it is preferable to brace the support 2a of the journalling device against the walls of the pit, as is shown at 23.

Figure 5:
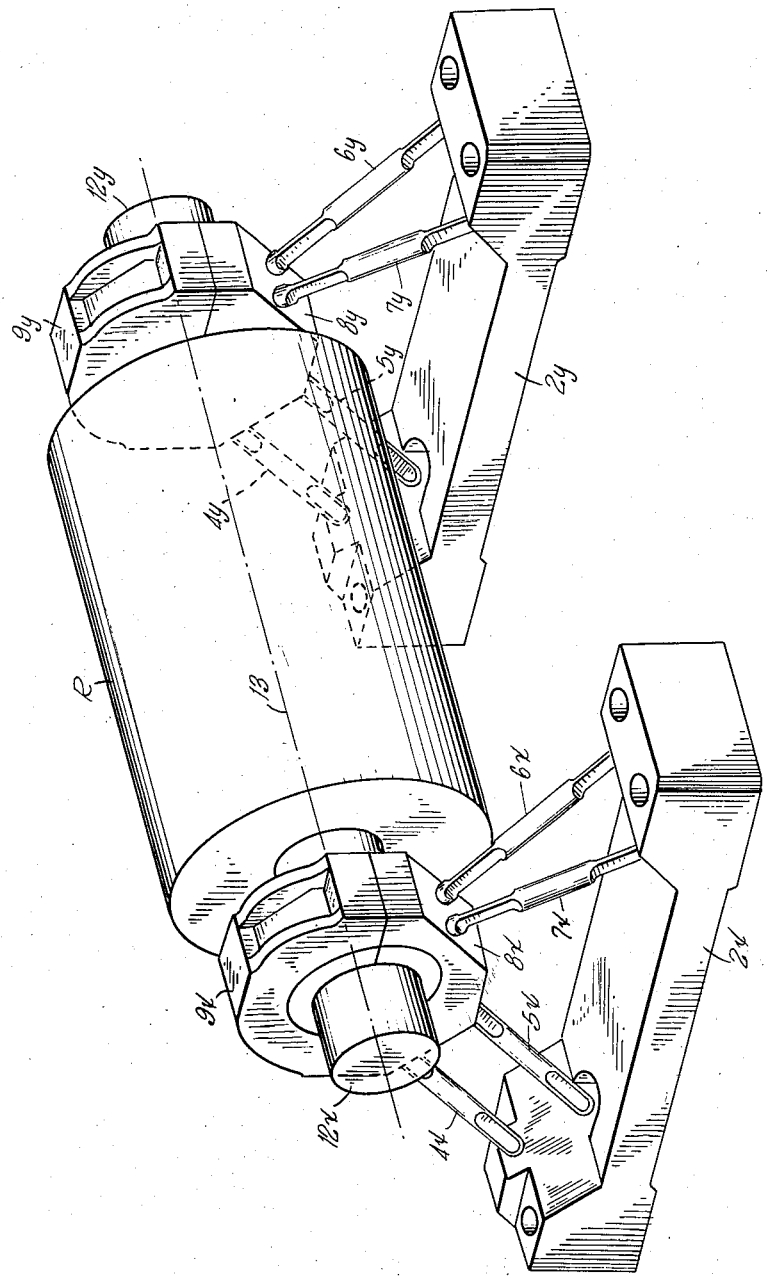
Fig. 5 shows schematically a perspective view of a journalling structure comprising two individual structures as shown in Fig. 1.

When employing a journalling device according to the invention on dynamic balancing machines for unbalance analysis of crankshafts or other axially elongated rotors, it is usually necessary to provide the device with two individual structures of the type described above. Such an assembly is illustrated in Fig. 5. Each of the two bearing units of this assembly is substantially identical with the one described above with reference to Figs. 1 and 2. For that reason, the same reference numerals are applied in Fig. 5 to corresponding components respectively, except that the components of the left-hand journalling structure are identified by the suffix x and those of the right-hand structure by the suffix y. The rotor is denoted by R and the respective ends of its shaft by 12x and 12y.

The term "rigid," as used herein, is understood to mean only a relative resistance, as it may be expected to be, depending upon the chosen spring material, rather than absolute rigidity.

It will be apparent to those skilled in the art that with respect to design details my invention permits of various modifications and hence may be embodied in devices other than those particularly illustrated and described herein, without departing from the essential features of my invention and within the scope of the claims annexed hereto.

I claim:

1. A journalling device for axially elongated rotors subject to elastic bending deformation when rotating at near critical speed and at supercritical speed, comprising a rigid bed structure, a shaft bearing for journalling the rotor, a plurality of at least four elongated rod members of spring material each rigidly secured at one end to said bearing and at the other end to said bed structure, each of said rod members being rigid to pulling, compressing and bending forces over most of its length but having at least one length-portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending in spaced relation to each other in a second geometric plane perpendicular to said journal axis and having their respective axes perpendicular to said first plane, said latter two members having their respective longitudinal axes spaced from said center point at opposite sides respectively of said center point; whereby said bearing is capable of elastically tumbling motion about said center point but is rigidly restrained from any other motion.

2. A journalling device for axially elongated rotors subject to elastic bending deformation when rotating, comprising a rigid bed structure, a bearing for journalling the rotor, a plurality of at least four elongated rod members of spring material each rigidly secured at one end to said bearing and at the other end to said bed structure, each of said rod members being rigid over most of its length but having at least one length-portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending parallel to each other in a second geometric plane perpendicular to said journal axis, said latter two members having their respective longitudinal axes perpendicular to said first plane and spaced respective equal distances from said center point at opposite sides respectively of said center point; whereby said bearing is capable of elastically tumbling motion about said center point but is rigidly restrained from any other motion.

3. A journalling device for axially elongated rotors subject to elastic bending deformation when rotating, comprising a rigid bed structure, a bearing for journalling the rotor, a plurality of at least four elongated rod members of spring material each rigidly secured at one end to said bearing and at the other end to said bed structure, each of said rod members being rigid over most of its length and having two constricted and elastically bendable portions located adjacent to said bed structure and to said bearing respectively; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending parallel to each other in a second geometric plane perpendicular to said journal axis, said latter two members having their respective longitudinal axes perpendicular to said first plane and spaced from said center point at opposite sides respectively of said center point; whereby said bearing is capable of elastically tumbling motion about said center point but is rigidly restrained from any other motion.

4. A journalling device for axially elongated rotors subject to elastic bending deformation when rotating, comprising a rigid bed structure, two bearings normally coaxially aligned for journalling the rotor, each of said bearings having a plurality of at least four rod members of spring material each rigidly secured at one end to said bearing and at the other end to said bed structure, each of said rod members being rigid over most of its length but having at least one length-portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending parallel to each other in a second geometric plane perpendicular to said journal axis and having their geometric axes perpendicular to said first plane, said latter two members having their respective longitudinal axes spaced from said center point; whereby each of said two bearings is capable of elastically tumbling motion about said center point but is rigidly restrained from any other motion.

5. A journalling device for axially elongated rotors subject to elastic bending deformation when rotating, comprising a rigid bed structure, a bearing for journalling the rotor, a plurality of at least four elongated rod members of spring material each rigidly secured at one end to said bearing and at the other end to said bed structure, each of said rod members being rigid but having at least one portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending in spaced relation to each other in a second geometric plane perpendicular to said journal axis and having their geometric axes perpendicular to said first plane, said latter two members having their respective longitudinal axes spaced from said center point at opposite sides of said point, whereby said bearing is capable of elastically tumbling motion about said center point but is rigid in all other respects; and oscillation pickup means mounted on said constricted portion of at least one of said rod members for response to forces in the rods.

6. In a journalling device according to claim 5, said pickup means being mounted at locations of minimum bending deflection and in substantially symmetric relation to said locations.

7. A journalling device for axially elongated rotors subject to elastic bending deformation when rotating, comprising a rigid bed structure, a bearing for journalling the rotor, a plurality of at least four elongated rod members of spring material each rigidly secured at one end to said bearing and at the other end to said bed structure, each of said rod members being rigid over most of its length but having at least one length-portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending in spaced relation to each other in a second geometric plane perpendicular to said journal axis and having their axes perpendicular to said first plane, said latter two members having their respective longitudinal axes spaced from said center point at opposite sides of said point; controllable damping means having respective members mounted on said bearing and on said bed structure respectively and engageable with each other for damping said tumbling motion; and control means connected with said damping means for selectively placing said damping means in and out of operation and optionally controlling the magnitude of damping effect.

8. A journalling device for axially elongated rotors subject to elastic bending deformation when rotating, comprising a rigid bed structure, a shaft bearing for journalling the rotor, a plurality of at least four elongated rod members of spring material each rigidly secured at one end to said bearing and at the other end to said bed structure, each of said rod members being rigid over most of its length but having at least one length-portion of constricted cross section so as to be elastically bendable in said portion; two of said rod members extending in a first geometric plane through the journal axis of said bearing and being inclined toward each other from said bed structure toward said bearing, said two members having their respective longitudinal axes intersect said journal axis at the center point of said bearing; two other ones of said rod members extending in spaced relation to each other in a second geometric plane perpendicular to said journal axis and having their axes perpendicular to said first plane, said latter two members having their respective longitudinal axes spaced from said center point at opposite sides of said point; and a controllable friction brake for damping said tumbling motion, said brake comprising two friction members of which one is mounted on said bearing and the other on said bed structure, said friction members having mutually engageable spherical friction faces concentric to said center point when in engagement with each other, said other friction member being displaceable away from said one friction member for rendering said brake inactive.

9. A journalling device according to claim 1 having six of said rod members, said other two rod members extending in opposite directions away from said bearing to said bed structure; and the remaining two of said six rod members being located in a third geometric plane through the journal axis of said bearing and being inclined toward each other from said bed structure toward said bearing, said latter two members having their respective longitudinal axes intersect said journal axis at said center point, and said third plane forming an acute angle with said first plane.

10. A journalling device for axially elongated rotors subject to elastic bending deformation when rotating, comprising a rigid bed structure, a shaft bearing for journalling the rotor, a plurality of more than four elongated rod members of spring material each rigidly secured at one end to said bearing and at the other end to said bed structure, each of said rod members being rigid to pulling, and compressing but not to bending forces, at least not over the whole of its length; a first group of said rod members extending from said bed structure toward that bearing and being inclined toward a geometric plane perpendicular to the journal axis, all of said first group of members having their respective longitudinal axes intersect said journal axis, at the same point, all other ones of said rod members extending in a geometric plane perpendicular to said journal axis, said plane intersecting said journal axis at the intersection point of said inclined members; at least one of said latter members having its longitudinal axis spaced from said center point whereby said bearing is capable of elastically tumbling motion about said center point but is rigidly restrained from any other motion.

No references cited.